Sept. 4, 1962 S. KYSER 3,052,375
CONTAINER POURING DEVICE WITH MEANS TO INDICATE DEGREE OF TILT
Filed June 18, 1959
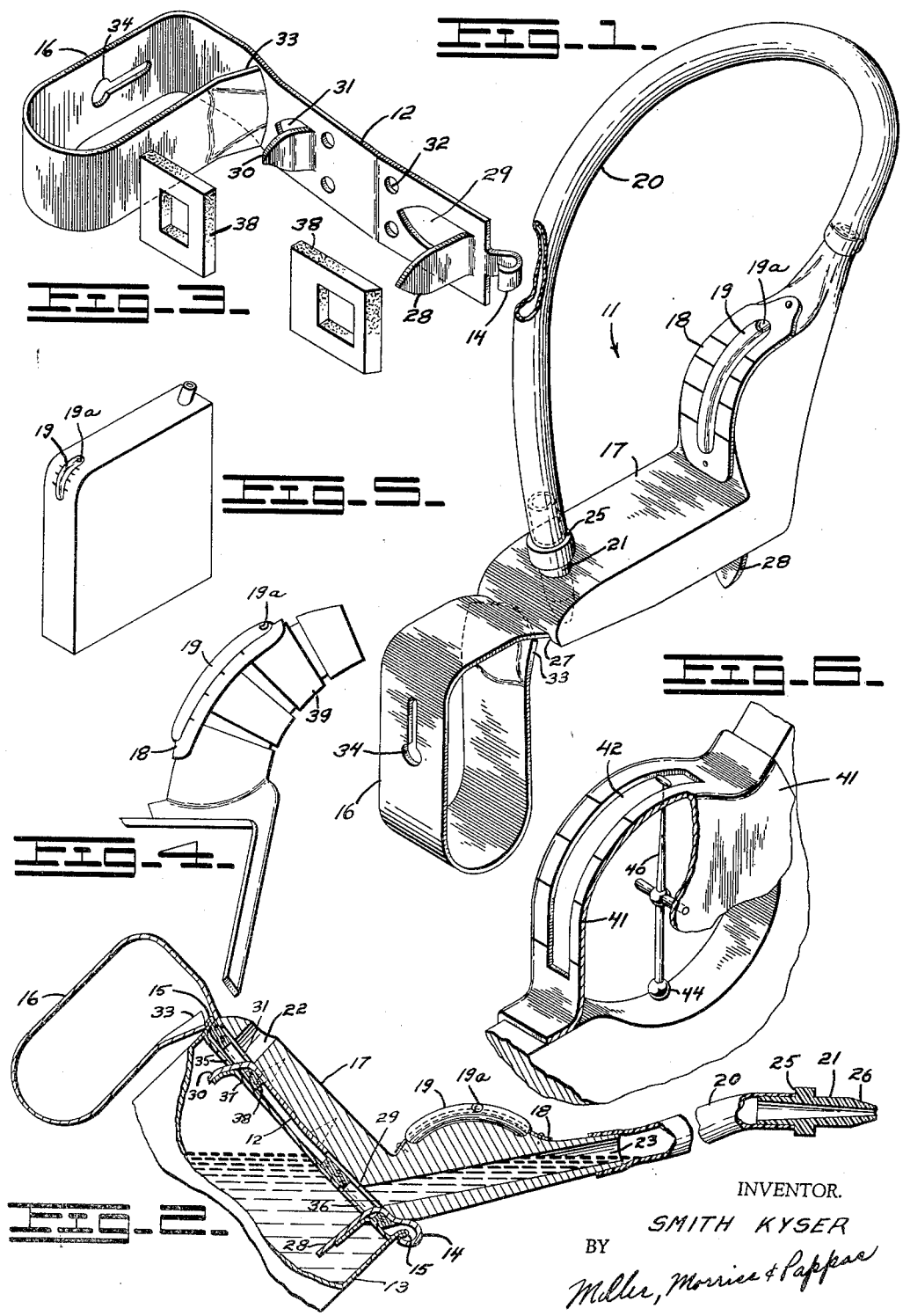
INVENTOR.
SMITH KYSER
BY
Miller, Morris & Pappas United States Patent Office 3,052,375
Patented Sept. 4, 1962

3,052,375
CONTAINER POURING DEVICE WITH MEANS
TO INDICATE DEGREE OF TILT
Smith Kyser, Lowell, Mich., assignor to Mazurflo Corporation, Saranac, Mich., a corporation of Michigan
Filed June 18, 1959, Ser. No. 821,185
2 Claims. (Cl. 222—41)

This invention relates to a dispensing attachment for tiltable containers and more particularly to a container pouring device having means thereon to indicate the degree of tilt and, hence, the amount of liquid dispensed from or remaining in a container.

The use of powered garden equipment, powered lawn mowers, outboard motors for boats, and other equipment upon which two and four cycle motors are utilized has greatly increased the consumption of oil in one-half pint, one pint and quart quantities. This is paricularly true in the case of engines requiring that the oil and gasoline be premixed in a definite ratio of oil to gas generally one-half pint of oil to one gallon of gasoline. Unless the user purchases the exact amount of oil needed for each filling, a problem arises as to measuring out the exact amount of oil needed.

In addition, it is economically more feasible to purchase a large container of oil rather than to purchase the oil, as needed, in one-half pint or pint containers. Thus, if a larger container of oil is purchased, the amount of oil needed is either estimated as it is poured from the larger container or the oil must be transferred to a measuring container for subsequent re-use, after measuring.

Another problem encountered concerns the unused oil that remains in the container. When it becomes necessary to refuel, the user desires to pour another increment of oil from the original container. Quite often, the user will not recall the amount of oil which had previously been used or the amount of oil which remains in the original container. If the user desires to determine whether or not enough oil remains in the can or container for a particular purpose, it becomes necessary to pour the oil from the can, measure the amount, and return it to the container. This not only is time consuming, but is difficult to accomplish inasmuch as the original oil container is usually a sealed can with only rough vent and pour holes punched therein. Generally a funnel and measuring cup are not readily available by which such a transfer and measurement can be accomplished.

The afore-mentioned problems of dispensing measured amounts of liquid from containers and the determination of the amount of liquid remaining in partially used opaque containers have also plagued gasoline service stations, repair shops, and many other types of industrial organizations.

Therefore, it is seen that a need exists for a dispensing attachment for tiltable containers such as oil cans or antifreeze containers, whereby a measured amount of liquid may be directly poured therefrom or whereby the exact amount of liquid remaining in a container may be easily determined without removing the liquid therefrom. In fact, the need for this type of dispensing means extends to any field where liquids are dispensed from containers.

In addition, dispensing attachments for sealed containers found in the prior art which punch vent and pour holes in the containers generally either make no provision for the sealing of such containers when not in use or provide elaborate capping structures for such containers. A need has existed for a simple, effective structure which permits sealing of such containers for storage purposes when not in use.

It is therefore an object of this invention to provide a dispensing structure for tiltable containers having means thereon to indicate the degree of tilt.

Another object of this invention is to provide a dispensing structure for tiltable containers whereby a measured quantity of liquid may be dispensed directly from the tiltable containers.

A further object of this invention is to provide a dispensing attachment to hold and tilt a container and having a curved bubble tube means thereon to indicate the degree of tilt.

Another object of this invention is to provide a metering dispenser having a tilt-indicating structure secured thereto.

Still another object of this invention is to provide a dispensing structure for tiltable containers whereby the exact amount of unused liquid remaining in a container may be easily determined without removing the liquid from the container.

A still further object of this invention is to provide a dispensing attachment for sealed containers to hold and tilt such containers, to punch vent and pour openings therein and having means thereon to indicate the degree of tilt.

Yet another object of this invention is to provide a dispensing structure for a tiltable container whereby a flexible pouring tube is provided thereon and having a nozzle jet which is selectively insertable within the vent channel to provide effective sealed storage of said container when not in use.

A still further object of this invention is to provide a dispensing structure for tiltable containers which is provided with a flexible pouring tube having a detachable nozzle jet which converts said containers into oiling cans.

Another object of this invention is to provide a dispenser container having level indicator means thereon to indicate the degree of tilt.

Another object is to provide a simple trouble free structure capable of high production and economical maintenance.

Other objects and advantages found in the construction of my invention will be apparent from a consideration of the following specification in connection with the appended claims and the accompanying drawings.

In the drawings:

FIGURE 1 is a perspective view of the novel dispensing attachment which is adapted to be mountable upon a container, illustrating the bubble tube by which the degree of tilt may be indicated and the flexible pour tube and nozzle jet in the sealed storage position.

FIGURE 2 is a sectional view of the dispensing attachment in its use position upon a container in a tilted position illustrating the pronged mounting bar, the vent and pour channels, the curved bubble tube indicator, the flexible tube and jet nozzle, and the level of the liquid about to leave the pour channel.

FIGURE 3 is a perspective view of the mounting bar illustrating the bead-engaging hook, the prongs, the vent and pour holes and gaskets, and the curved, resilient, bead-engaging handle.

FIGURE 4 is a side view illustrating the bubble tube tilt-indicating means utilized on another type of dispensing attachment well known in the art.

FIGURE 5 is a perspective view of a modified container with the bubble tube tilt indicating means integrally provided on one corner of the container.

FIGURE 6 is a partial sectional schematic view illustrating a pendulum-type pointer unit as an alternate method of indicating the degree of tilt of a dispensing attachment or container upon which it is mounted.

*General Description*

In general, a dispensing attachment 11 for tiltable containers is provided which has means to hold and tilt such containers. Means are provided on the dispensing attachment to indicate the degree of tilt and, hence, the amount of liquid which has been poured from the container when such dispensing attachment is in use. In the preferred embodiment, a mounting bar 12 is provided which fits diametrically across the top of a container 13. One end of the bar 12 is provided with hook means 14 to engage the upper bead 15 of a container 13. The other end of the bar 12 is curved to form a handle 16 which also lockably engages the upper bead 15 of the container 13 at a point diametrically opposite the hook means 14. In this manner the dispensing attachment 11 is operatively secured to the container 13 so as to hold and tilt the container 13 as desired.

The mounting bar 12 has vent and pour holes and is provided with prongs which automatically punch vent and pour openings in the top of the container 13 as the dispensing attachment 11 is placed in its use position on the container 13. A pedestal spout member 17 is provided on the bar 12 which has bent and pour channels therethrough. The vent and pour channels are in register with the vent and pour openings in the container and the vent and pour holes in the bar.

The pedestal spout 17 is provided with a calibrated scale 18 and a curved bubble tube 19 in association therewith so as to indicate the degree of tilt of the dispensing attachment and the container, and, hence, the amount of liquid which is being dispensed or the amount of liquid which remains in the container.

A flexible transparent tube 20 is attachable to the pedestal spout structure 17 so as to provide a continuation of the pour channel. This flexible tube greatly facilitates the delivery of liquid into any container or tank. A detachable nozzle jet 21 is also provided on the tube. When used with the tube, the jet makes it possible to deliver minute amounts of oil to any desired point, thus converting any container into an oiling can. The nozzle jet is adapted to engage the vent channel when the dispensing attachment and container are not in use. In this manner, the container is effectively sealed for storage purposes.

It is thus seen that a versatile dispensing attachment is provided for use on containers. Not only does the dispensing attachment permit accurate dispensing or metering of liquids directly from containers, but it provides a means to easily measure the contents remaining in opaque containers without the necessity of removing such contents from the containers. In addition, the dispensing attachment provides a simple means for effective sealing of the container when not in use.

Thus, a novel and highly utilitarian dispensing attachment is provided requiring a minimum of inconvenience to the user.

*Specific Description*

In the preferred embodiment, the dispensing attachment 11, as shown in FIGURE 1, consists of a mounting bar 12, a pedestal spout 17 having bubble tube tilt-indicating means thereon, and a flexible tube 20 having a detachable nozzle jet 21.

As shown in FIGURE 2, the pedestal spout 17 is provided with a vent channel 22 and a pour channel 23 therethrough. A curved bubble tube 19 is provided on the pedestal spout 17 and has a graduated scale plate 18 in association therewith. The scale plate 18 is calibrated to indicate the degree of tilt of container 13 in accordance with the relative movement of the bubble 19a within the bubble tube 19 as the container 13 is being tilted. The scale graduations may be numbered to indicate amounts, such as ¼ pint, ½ pint, etc., which would flow from the container if it were tilted to any corresponding degree of tilt as shown by the location of the bubble in reference to such scale graduations. In the full or upright position, the bubble 19a is located in the uppermost portion of the bubble tube 19, as shown in FIGURE 1. In the empty or full pour tilted position, the bubble 19a would be located in the lower end of the bubble tube 19. The intermediate pouring positions of the container 13 would be calibrated on the scale 18 to indicate the amount of liquid which had been poured from the container 13.

An intermediate pouring position, as shown in FIGURE 2, is indicated by the intermediate position of the bubble 19a within the bubble tube 19.

A removable flexible clear plastic pour tube 20 is provided on the pedestal spout 17 to provide a continuation of the pour channel 23.

However, it is within the scope of the invention to utilize any type of flexible tubing, such as rubber, for this purpose. In the event such tubing is opaque, a transparent section must be provided at the end of the pour channel of the spout so that the flow of liquid may be observed therethrough.

A detachable nozzle jet 21 is provided for use with the flexible tube 20, as shown in FIGURES 1 and 2. An integrally formed collar 25 is annularly provided on the nozzle jet 21 to form a tube receiving shoulder thereon. The nozzle jet 21 has a tapered end portion 26 to matingly engage the vent channel 22, as shown in FIGURE 1. In this manner, effective sealing of the container 13 is accomplished when the container 13 is not in use. This prevents accidental spillage if the container is inadvertently tipped over during storage. The flexible tube 20, when used with the nozzle jet 21, provides secondary oiling means for the oiling of simple structures, such as lawn mower wheels and the like. In addition, inaccessible places are easily reached by use of the tube 20 and jet 21, thus converting an ordinary can of oil into an oiling can.

The base of the pedestal spout 17 has longitudinal channel 27 provided thereacross to matingly receive the mounting bar or plate 12. The mounting bar 12 may be secured to the pedestal spout 17 by screws or any other suitable method of fastening, as shown in FIGURE 2.

A hook portion 14 is provided at one end of the mounting bar 12 so as to selectively engage the upper bead 15 of a sealed container 13. The elongate portion of the mounting bar 12 is configured to rest diametrically across the top of a container in its use position. A downwardly depending pour prong 28 is struck from the mounting bar 12 proximate to the hook portion 14. A pour hole 29 is automatically provided through the mounting bar 12 when the pour prong 28 is struck therefrom. A downwardly depending vent prong 30 is struck from the mounting bar or plate 12 opposite said pour prong 28. A vent hole 31 is automatically provided through the mounting bar 12 when the vent prong 31 is struck therefrom. Screw holes 32 are provided in the mounting bar 12 to receive screws that secure the pedestal spout 17 in position upon the mounting bar 12.

A handle portion 16 is provided on the mounting bar 12 opposite the hook portion 14. The handle is configured to engage the upper bead 15 of a container 13, under tension, as shown in FIGURES 1 and 2. The end portion of the handle is bent inwardly so that the container will displace the end portion of the handle 16 while the dispensing attachment is being mounted thereon. The end portion of the handle 16 will snap into position under the upper bead 15 of the container 13 when the mounting is complete. The end of the handle portion 16 is also transversely curved so that the edges 33 of the handle 16 are spaced apart from the side of the container 13. In this manner, the edges 33 of the handle 16 adjacent the side of the container 13 may be easily grasped for snap-disengagement of the handle 16 from beneath the upper bead 15. In addition the handle 16 is provided with an inverted key-hole slot 34 so as to permit the dispensing attachment and container attached thereto to be suspended from a wall-mounted nail for storage purposes.

As the dispensing attachment 11 is placed in position upon the container 13, the vent prong 30 and pour prong 28 strike a vent opening 35 and a pour opening 36, respectively, in the top 37 of the container 13. As shown in FIGURES 2 and 3, suitable gaskets 38 are provided on the bottom surface of the mounting bar 12 around the vent hole 31 and pour hole 29, so as to provide an effective seal against the top of the container around the vent opening 35 and pour opening 36 when the dispensing attachment is in its use position. It is thus seen, as shown in FIGURE 2, that the pour channel 23, the mounting bar pour hole 29, gasket 38, and the container pour opening 36 are substantially in register so as to provide direct access from the interior of the container 13 to the outside. This is also true of the vent channel 22, the mounting bar vent hole 31, gasket 38, and the container vent opening 35.

The curved bubble tube 19 and calibrated indicator scale 18 may also be affixed to another type of can opener and pouring attachment which is well known in the art. A tubular spout member 39 having prong means to punch a pour opening in a container is provided with tilt-indicating means thereon. With this type of attachment, independent vent means must be provided for. This type of alternate dispensing attachment which is modified by addition of means to indicate the degree of tilt is shown in FIGURE 4.

In addition, it is believed to be within the scope of this invention to integrally provide such means to indicate the degree of tilt on specially designated containers as shown in FIGURE 5. Such containers with integrally formed tilt-indicating means could be provided with handles to facilitate tilting of the containers.

Another type of tilt-indicating means which may be incorporated into the dispensing attachment 11 in place of the bubble tube 19 is illustrated in FIGURE 6. A free-swinging T-head pointer 40 is mounted within a casing structure 41 having a viewing slot 42 provided with suitable calibrated scale markings therealong. The casing 41 is mountable over a grooved portion of a pedestal spout which allows clearance for the pointer 40 to swing freely. A weight 44 is provided on the pointer 40 in order to provide the desired stability in operation. This calibrated tilt-indicating unit indicates the degree of tilt of the container and dispensing attachment 11 and, hence, the amount of liquid poured therefrom.

It is within the scope of this invention to have the curved bubble tube and the calibrated scale associated therewith provided as a detachable tilt-indicating unit. In this manner the tilt-indicating unit could be detached from the dispensing attachment for independent use on containers or for interchangeable use on other dispensing attachments. Such an interchangeable tilt-indicating unit could be provided with a magnetic base or other means to provide for snap attachment to containers. In this manner, a plurality of dispensing attachments could be utilized on such containers with only one tilt indicating unit being necessary for the container actually in use. In addition, stored containers would thus remain sealed because it would not be necessary to remove the entire attachment for use on another container. Great economy would result because each dispensing attachment would not require its own tilt-indicating unit. The tilt-indicating unit shown in FIGURE 6 could be converted to the snap detachment type with only minute structural changes well-known in the art. The same type of snap-on structural unit could also be provided for use with the bubble tube tilt-indicating means.

*Operation*

In operation, the hook portion 14 of the mounting bar 12 engages the upper bead 15 of a container, as shown in FIGURE 2. The dispensing attachment 11 is pressed downwardly across the top 37 of the container 13 while utilizing the upper bead 15 as a pivotal point. The prongs, 30 and 28, strike vent and pour openings 35 and 36 respectively, in the top of the container 13. The mounting operation is completed by pulling downwardly and outwardly on the handle 16 so as to allow the transversely curved portion of the handle 16 to snap under the upper bead 15 of the container 13. In this position, the dispensing attachment 11 is lockably secured to the container 13.

The handle 16 may be grasped and the dispensing attachment 11 and container 13 may be tilted as desired. The flexible tube 20 is detached from the nozzle oiling jet 21, leaving the nozzle oiling jet within the vent channel opening 22. The flexible tube 20 is then directed to the desired point of delivery. If the container 13 is full, it is tilted slowly until the bubble 19a indicates on the scale 18 the exact amount of liquid to be poured. The container is held in this position until the liquid stops flowing. This results in delivery of any desired amount of liquid from the container to the point of use. The container is then returned to its upright position and the flexible tube 20 is placed on the nozzle jet 21 which is matingly resting within the vent channel opening 22 to seal the container for storage.

When it is again desired to dispense liquid from the stored container, the user generally desires to determine the amount of liquid that was previously taken from the container or the amount of liquid remaining in the container. This may be accomplished by tilting the container until the liquid appears in the flexible tube as shown in FIGURE 2. If a modification of the dispensing attachment is being utilized not having the flexible tube thereon, the container 13 is tilted until the liquid is about to pour from the spout. At this point, a quick reference to the position of the bubble 19a in relation to the calibrated scale 18 in association therewith will indicate the amount of liquid remaining in the container and, consequently, the amount of liquid which had been previously taken from the container 13.

The entire assembly (container with the dispensing attachment thereon) may be used as an oiling can by using the nozzle jet 21 with the flexible tube 20, as shown in FIGURE 2, to selectively deliver minute amounts of oil to any desired point. Of course, use of the flexible tube without the jet will deliver liquid in larger quantities and at a faster rate of flow.

It is thus seen that a highly utilitarian dispensing attachment is provided permitting ease of storage, ease fo measuring, and ease of dispensing of liquids from containers.

Various modifications of the invention may be made without departing from the principle thereof. Each of the modifications is to be considered as included in the hereinafter appended claims unless these claims by their language expressly provide otherwise.

Having set forth the nature of my invention, I claim the following:

1. A sealing and metering attachment for selective mounting upon tiltable cylindrical containers, the combination comprising:
    (a) a bar spout member selectively and lockably mountable across the top of a cylindrical container, said bar spout member having vent and pour channels therethrough;
    (b) a resilient handle integral with said bar spout member, said handle adapted at the end thereof for snap engagement with the upper bead of a container;
    (c) prongs extending downwardly from said bar spout member and adapted to punch vent and pour openings in the top of said container substantially in register with said vent and pour channels;
    (d) sealing gasket means provided on the bottom of said bar spout member and having openings therethrough substantially in register with said vent and pour channels and said vent and pour openings, said sealing gasket means adapted to sealingly engage the top surface of said container around said vent and pour openings; and (e) a bubble tube provided on said bar spout member so as to indicate the degree of tilt of said cylindrical container, said bubble tube positioned proximate to and external of said pour channel.

2. A sealing and metering attachment for selective mounting upon tiltable cylindrical containers, the combination comprising:

(a) a bar spout member selectively and lockably mountable across the top of a cylindrical container, said bar spout member having vent and pour channels therethrough;

(b) a resilient handle integral with said bar spout member, said handle adapted at the free end thereof for snap engagement with the upper bead of a container;

(c) prongs extending downwardly from said bar spout member and adapted to punch vent and pour openings in the top of said container substantially in register with said vent and pour channels;

(d) sealing gasket means provided on the bottom of said bar spout member and having openings therethrough substantially in register with said vent and pour channels and said vent and pour openings, said sealing gasket means adapted to sealingly engage the top surface of said container around said vent and pour openings;

(e) a flexible tube having one end thereof attached to said bar spout member so as to form a continuation of said pour channel, the other end of said flexible tube adapted to selectively and sealingly engage said vent channel; and (f) a bubble tube provided on said bar spout member so as to indicate the degree of tilt of said cylindrical container, said bubble tube positioned proximate to and external of said pour channel.

References Cited in the file of this patent

UNITED STATES PATENTS

| 344,538 | McFarland | June 29, 1886 |
| 1,293,244 | Thayer et al. | Feb. 4, 1919 |
| 1,436,211 | Sweet | Nov. 21, 1922 |
| 1,481,359 | Dye | Jan. 22, 1924 |
| 1,952,840 | Claus et al. | Mar. 27, 1934 |
| 2,061,582 | Luthi | Nov. 24, 1936 |
| 2,531,563 | Feldheim | Nov. 28, 1950 |
| 2,812,112 | Allen | Nov. 5, 1957 |

FOREIGN PATENTS

| 1,137,186 | France | Jan. 7, 1957 |